United States Patent
Grishashvili et al.

(10) Patent No.: US 8,991,535 B2
(45) Date of Patent: Mar. 31, 2015

(54) MODULAR, CUSTOMIZABLE AND SCALABLE MECHANICAL DESIGN FOR THE ELECTRIC CAR ASSEMBLY BASED ON THE EXISTING VEHICLE CHASSIS

(71) Applicant: Electric Motor Werks, Inc., Palo Alto, CA (US)

(72) Inventors: Henry Grishashvili, San Jose, CA (US); Valery Miftakhov, San Mateo, CA (US)

(73) Assignee: Electric Motor Werks, Inc., San Carlos, CA (US)

( * ) Notice: Subject to any disclaimer, the term of this patent is extended or adjusted under 35 U.S.C. 154(b) by 0 days.

(21) Appl. No.: 13/672,598

(22) Filed: Nov. 8, 2012

(65) Prior Publication Data

US 2013/0112490 A1    May 9, 2013

Related U.S. Application Data

(60) Provisional application No. 61/557,398, filed on Nov. 8, 2011.

(51) Int. Cl.
   *B60R 16/04*  (2006.01)
   *B60K 1/04*  (2006.01)
   *B60K 1/00*  (2006.01)

(52) U.S. Cl.
   CPC ... *B60K 1/04* (2013.01); *B60K 1/00* (2013.01); *B60K 2001/0411* (2013.01)
   USPC ...................................................... 180/68.5

(58) Field of Classification Search
   CPC ..................................................... B60R 16/04
   USPC ...................................................... 180/68.5
   See application file for complete search history.

(56) References Cited

U.S. PATENT DOCUMENTS

| | | | | |
|---|---|---|---|---|
| 5,476,151 A * | 12/1995 | Tsuchida et al. | ............ | 180/274 |
| 6,216,811 B1 * | 4/2001 | Herc | ............ | 180/68.5 |
| 6,371,229 B1 * | 4/2002 | Kakiuchi | ............ | 180/65.25 |
| 6,668,957 B2 * | 12/2003 | King | ............ | 180/68.5 |
| 6,827,168 B2 * | 12/2004 | Miyazaki | ............ | 180/68.5 |
| 6,994,178 B2 * | 2/2006 | Mizuno | ............ | 429/430 |
| 7,413,045 B2 * | 8/2008 | Tien | ............ | 180/68.5 |
| 7,445,076 B2 * | 11/2008 | Shigematsu | ............ | 180/299 |
| 7,543,666 B2 * | 6/2009 | Connelly et al. | ............ | 180/68.5 |
| 8,122,989 B2 * | 2/2012 | Burchett et al. | ............ | 180/68.5 |
| 8,479,868 B2 * | 7/2013 | Wakatsuki et al. | ............ | 180/299 |
| 8,511,416 B2 * | 8/2013 | Hiruma | ............ | 180/299 |
| 2004/0090085 A1 * | 5/2004 | Kawasaki et al. | ............ | 296/187.09 |
| 2006/0220405 A1 * | 10/2006 | Ohe et al. | ............ | 296/37.1 |
| 2013/0118823 A1 * | 5/2013 | Pohl et al. | ............ | 180/68.5 |
| 2013/0119704 A1 * | 5/2013 | Amano et al. | ............ | 296/187.1 |
| 2013/0192914 A1 * | 8/2013 | Nakamori | ............ | 180/68.5 |

* cited by examiner

*Primary Examiner* — Jeffrey J Restifo
(74) *Attorney, Agent, or Firm* — TransPacific Law Group; Pavel I. Pogodin, Esq.

(57) ABSTRACT

Described is an electric vehicle conversion system and method comprising one or more battery packs disposed within one or more battery pack enclosures, a frontal mounting subframe assembly and an electric motor mounting frame assembly. In one implementation, the vehicle conversion system incorporates six battery pack enclosures. The described components and assemblies are designed to simplify building an electric car on the basis of an existing vehicle chassis. The frontal mounting subframe assembly is designed to be securely attached to the vehicle frame using at least four bolts and is designed to securely hold two battery pack enclosures disposed under the front hood of the vehicle. The electric motor mounting frame assembly is designed to mechanically mate with the existing engine mounting points of the original vehicle and is attached to said points with at least two bolts.

6 Claims, 6 Drawing Sheets

MODULAR, CUSTOMIZABLE AND SCALABLE MECHANICAL DESIGN FOR THE ELECTRIC CAR ASSEMBLY BASED ON THE EXISTING VEHICLE CHASSIS

CROSS-REFERENCE TO RELATED APPLICATIONS

The present patent application relies on and claims the benefit or priority of U.S. provisional patent application No. 61/557,398 filed Nov. 8, 2011, the entire disclosure of which is incorporated by reference herein.

BACKGROUND OF THE INVENTION

1. Field of the Invention

The present invention relates generally to the field of the mechanical design of the chassis for electric vehicles and specifically electric passenger cars and in particular to the design of battery enclosures, battery pack enclosure mounting frame and electric motor mounting frame.

2. Description of the Related Art

There are two main approaches to implementing an electric vehicle or EV (a vehicle that uses an electric motor as its main propulsion unit and is powered by an electric battery). The first approach is to design and build an electric vehicle from the ground up. While allowing for the maximum flexibility in design choices, this approach is very expensive, time consuming and complex—both from a systems design perspective, as well as from a regulatory compliance perspective. The second, more cost-effective, approach is to use an existing gasoline vehicle chassis as a mechanical platform for designing and building an electric vehicle. When applied to the existing internal combustion engine (ICE) vehicle, this methodology is referred to as an "electric conversion". The aforesaid conversion process may also be applied to a bare ICE vehicle chassis (a "glider" vehicle). The various described inventive systems and processes provide a cost-effective, highly manufacturable implementation of the aforesaid second approach for implementing an EV. The following description will concentrate on applying the various embodiments of the inventive systems and processes to an existing ICE vehicle platform. However, as it would be appreciated by those of skill in the art, the same inventive methodology as described hereinbelow can be applied to the aforesaid "glider" vehicle as well. Furthermore, it should be emphasized at the outset, that the inventive methodologies and systems described herein are not limited to conversions of electrical passenger cars only, but could be adopted, with or without modifications or alterations, for use in any other suitable vehicle.

As would be appreciated by those of skill in the art, in the process of converting an ICE car into the 100% electric vehicle the majority of mechanical components of the ICE car can be left intact. Parts that are removed from the ICE vehicle may include: the internal combustion engine (with certain attached accessory components such as power steering pump, vacuum pump, alternator etc.), the exhaust system, the fuel tank, the radiator and the 12V lead-acid battery. The new parts that are installed in the converted vehicle may include: the electric motor with the motor mount, the battery pack composed of several battery enclosures holding and securing multiple battery cells and the frame supporting those enclosures.

Various mechanical parts, systems and assemblies in a modern passenger vehicle have to meet a large set of requirements related to durability, resistance to vibration, resistance to corrosion and the like. Because of the considerable weight of the batteries in an electric vehicle, battery enclosure housing such batteries must be designed to be strong enough to carry a large weight (~700 lb in one exemplary converted car) and has to routinely withstand significant acceleration forces in every direction, reaching 1 g in normal operating conditions, which results in high levels of mechanical stress exerted on the enclosure structure and mounts. At the same time, the aforesaid battery enclosure must be waterproof, and should be able to withstand corrosion and vibration.

The same mechanical design requirements that apply to the structure of the enclosure itself, also apply to the enclosure mounting elements, which may include a vehicle frame or a dedicated sub-frame. In addition, such goals as weight reduction and the ability to crumble during the crash impact should also be considered in designing the battery enclosure mount.

Furthermore, the electric motor mounts should be able to bear the weight of the motor, withstand substantial acceleration force in any direction and also withstand the full torque produced by the electric motor. Due to the inherent nature of the electric motors, the torque application can be very sudden and can generate much larger stresses on the mechanical mounting system compared to the gasoline engine rated at the same torque/power output.

Most of the existing electric car conversions are highly customized, hand crafted. Parts for such conversions are not designed with industrial production scalability in mind. The process itself is highly complicated requiring significant knowledge and experience in mechanics, electrical engineering in general and specifically in power electronics. Hence those conversions are not generally suitable for production on an industrial scale.

SUMMARY OF THE INVENTION

The inventive methodology is directed to methods and systems that substantially obviate one or more of the above and other problems associated with conventional design of battery enclosures, battery pack enclosure mounting frame and electric motor mounting frame.

In accordance with one or more embodiments of the invention, there is provided an electric vehicle conversion system comprising at least one battery pack disposed within at least one battery pack enclosure, a frontal mounting subframe assembly attached to a vehicle frame and operable to securely support the at least one battery pack enclosure, an electric motor and electric motor mounting frame assembly attached to the vehicle frame and operable to securely support the electric motor.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
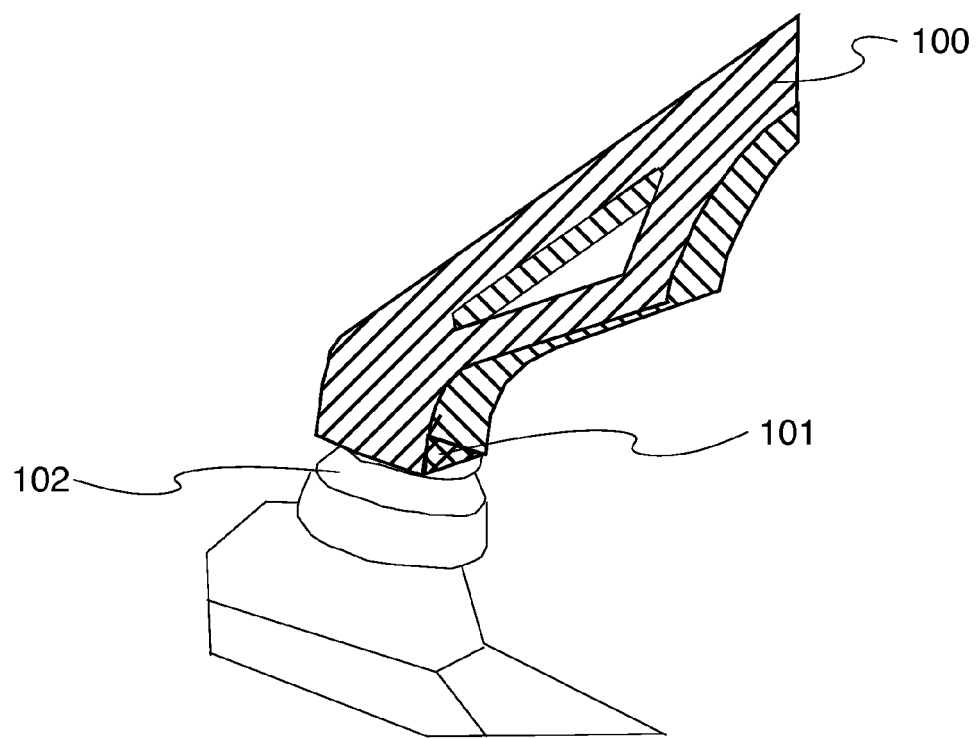
FIG. 1 illustrates an exemplary embodiment of the inventive electric motor mounting frame assembly attached to the original vehicle's engine mount.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The inventive methodology is directed to methods and systems that substantially obviate one or more of the above and other problems associated with production of the electric car conversion kits.

In accordance with one or more embodiments, various mechanical parts and components described herein can be produced on a large scale using a semi-automatic, computer numerical controlled (CNC) manufacturing process at a relatively low price using commonly available materials. In many instances, no special or custom equipment is required which significantly increases the attractiveness of the resulting conversion solution to the installers and end users.

In accordance with one or more embodiments, the architecture of the mechanical component design described herein is substantially modular. One of the important features of the aforesaid modular component design is the simplification of the vehicle conversion process. In accordance with one or more embodiments, some or all system parts are pre-manufactured and pre-assembled in such way that complex and sensitive electronic components are enclosed in a bolt-on module with simplified plug-and-play electrical interfaces. Installation of such modules will not require skills or experience beyond those of an automotive shop mechanic.

In addition, the aforesaid modular design paradigm enables a variety of customizations. For example, different battery packs can be installed in the vehicle based on the customer demands of range, price and performance. As the battery technology advances, the new batteries can be installed in the same mechanical battery pack enclosures without the need to change the overall conversion process. Moreover, in the future, customers will have an option to upgrade their batteries by simply swapping the complete battery pack enclosures with the new ones housing new, more advanced, battery units.

In accordance with one or more embodiments, the inventive EV conversion solution comprises the following principal components: one or more battery packs disposed within one or more battery pack enclosures, a frontal mounting subframe assembly and an electric motor mounting frame assembly. Additional vehicle parts and systems (not specifically described herein) include various cables, cable mountings, controller, charging unit, electronic control unit, power steering pump, vacuum pump etc. In one or more embodiments, all of the aforesaid additional vehicle parts and systems will be delivered to the conversion customer (or the third party performing the vehicle conversion) ready to be bolted on and connected.

In accordance with one or more embodiments, the inventive electric motor mounting frame assembly is designed to mechanically fit onto and mate with the vehicle's existing engine mounting brackets and is securely fastened to the existing engine mounting points with at least two bolts, as shown in FIG. 1. Specifically, FIG. 1 illustrates an exemplary embodiment of the inventive electric motor mounting frame assembly 100 having its horizontal portion 101 attached to the original vehicle's engine mount point 102 using a bolt (not shown).

Figure 2:
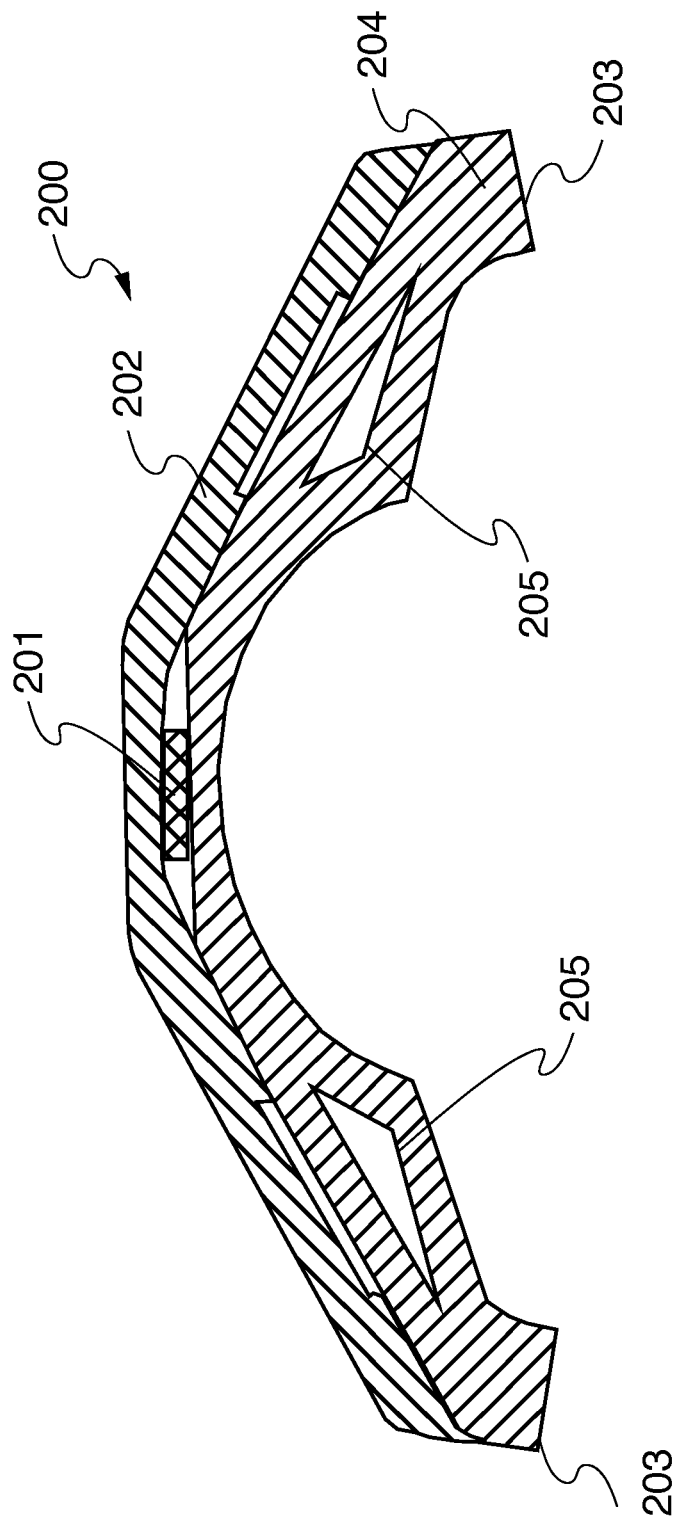
FIG. 2 depicts an exemplary embodiment of the inventive electric motor mounting frame assembly.

As would be appreciated by those of skill in the art, the described design minimizes the effort necessary to install the electric motor into the vehicle. In one exemplary implementation illustrated in FIG. 2, the electric motor (not shown) is attached to the bottom semi-circular portion of the electric motor mounting frame assembly 200 and secured to the horizontal portion 201 of the electric motor mounting frame assembly 200 using a single half inch bolt inserted from the top through the horizontal portion 201 of the frame into the motor's lifteye threaded hole (not shown).

In addition, in one or more embodiments, the electric motor may be secured from below with a ⅛ inch thick steel strip both ends of which are bolted to the electric motor mounting frame assembly 200. Motor can be removed from the vehicle without being detached from the electric motor mounting frame assembly.

In accordance with one or more embodiments, the inventive electric motor frame assembly is preferably manufactured from quarter inch thick mild steel. The two shown side steel profiles 202 and 204 of the assembly 200 can be cut on a plasma cutting CNC machine and welded together using horizontal members 201 and similar horizontal members (not shown) disposed at the bottom portions 203 of the assembly 200. Holes of round or other alternative shapes 205 can be cut in the profiles 202 and 204 for weight reduction purposes. Simplicity of the design and availability of CAD CNC design files allows outsourcing of this part to any domestic or foreign metal shop.

Another important advantage of the described electrical motor mount assembly in accordance with one or more embodiments of the invention, is that in majority of instances, only insignificant modifications of the assembly's design are required to adopt the same conceptual design to almost any existing rear-wheel-drive passenger vehicle model. This is due to the fact that all rear-drive vehicles share similar engine mounting approaches.

Figure 3:
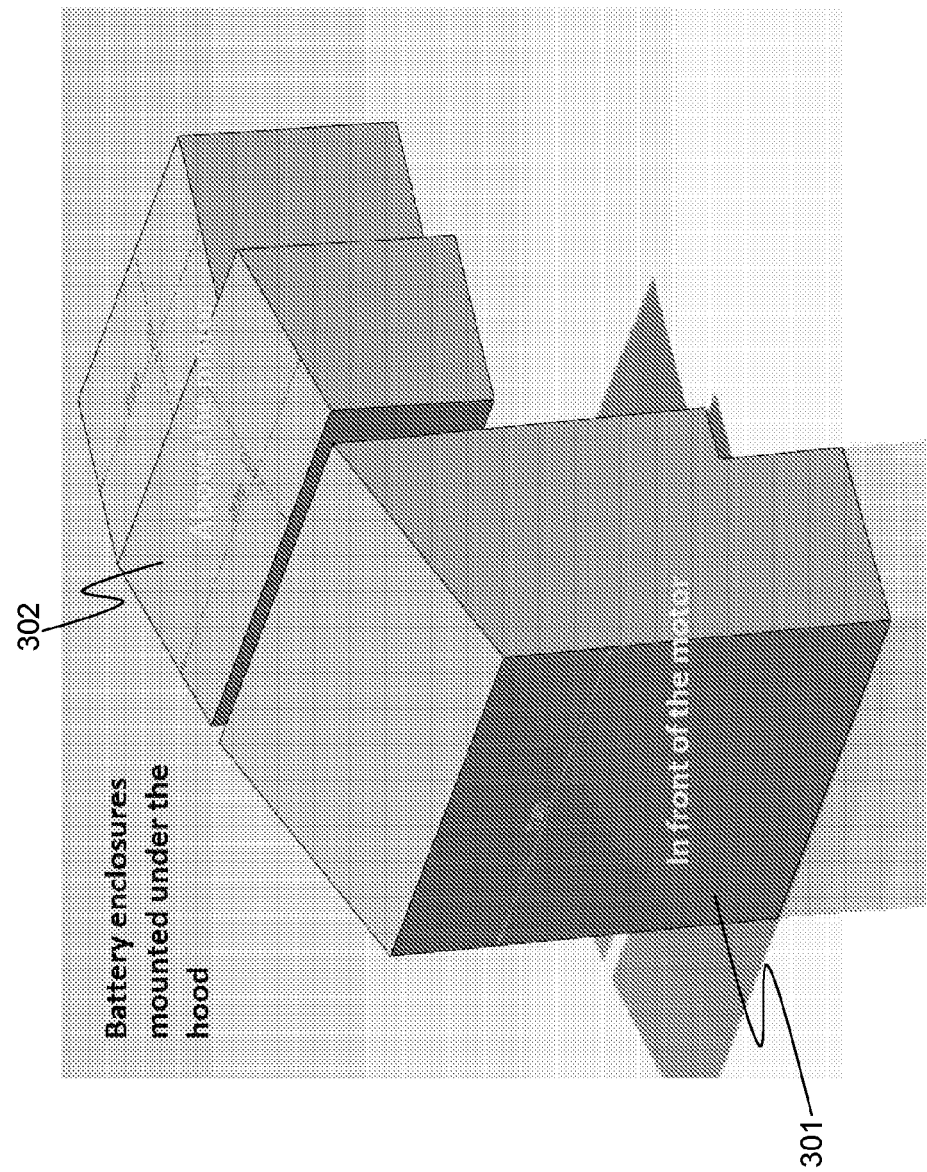
FIG. 3 depicts exemplary embodiments of battery pack enclosures mounted under the hood of an electric passenger vehicle.
Figure 4:
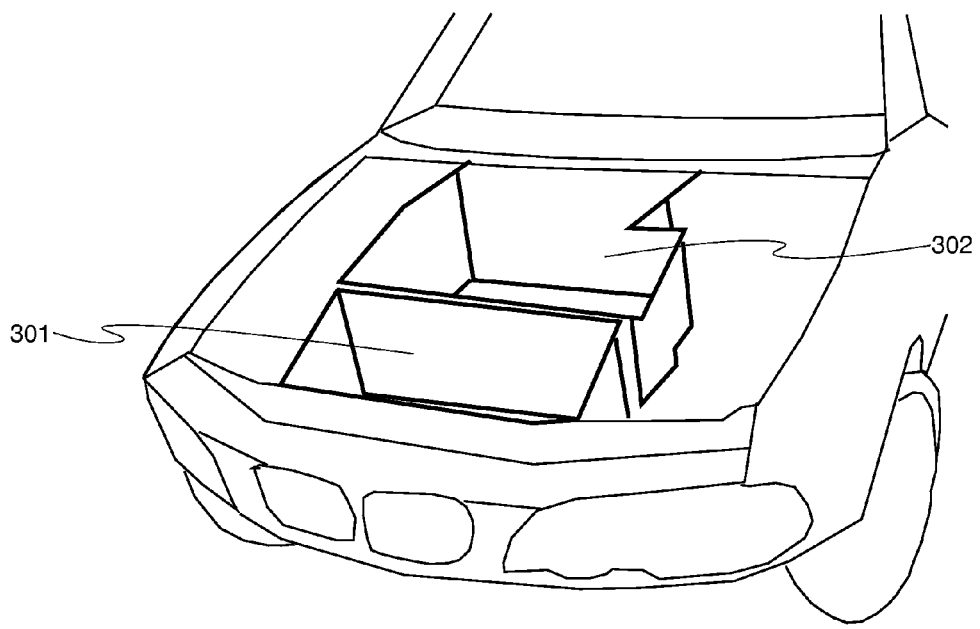
FIG. 4 depicts another view on the exemplary embodiments of battery pack enclosures mounted under the hood of an electric passenger vehicle.

In accordance with one or more embodiments, the described modular design of EV conversion allows easy bolt-on installation, removal or replacement of the battery pack enclosures. One exemplary electric vehicle conversion configuration illustrated in FIGS. 3, 4 and 5 incorporates up to six different battery pack enclosures: two enclosures 301 and 302 shown in FIGS. 3 and 4 are located under the hood (in front of and on top of the motor) of the vehicle, one enclosure 501 shown in FIG. 5 is located in the trunk in place of the spare tire, one enclosure (not shown) is located in place of the original 12V lead-acid battery, and two enclosures (not shown) are located underneath the vehicle in place of the fuel tank (for example, in BMW, fuel tank is split into 2 parts and is located between the front and rear wheel axles, closer to the rear axle to the left and to the right of the drive shaft).

In accordance with one or more embodiments, each of the described battery pack enclosures houses a predetermined number of a standard form-factor, LiFePo4 battery cells with 100 AH capacity each, electrically connected in series configuration. Preferably, each battery cell housed by the battery pack enclosure is equipped with an electronic Battery Management System (BMS) board. All BMS boards are, in turn, electrically connected with one another to form a daisy chain. In one configuration, the electrical interface of the entire battery pack enclosure assembly consists of the main power connector (carrying positive or negative enclosure voltage) and five BMS connectors. In one implementation, power connectors of all battery pack enclosures are connected in series. Two of the BMS connectors are connected together in a daisy chain and to the main control unit. As it would be appreciated by those of skill in the art, such design allows for easy installation of any number of battery pack enclosures depending on the customer preferences. The BMS subsystem is designed to monitor each battery cell and signal when the cell is about to go outside of its normal operating envelope. Specifically, the two NC (normally closed) BMS terminals on each sub-pack are pulled open when any one of the sub-pack's cells goes below the preset LVC (low-voltage cut-off) point (normally 2.5V for LiFePo4 cells) or goes above the preset HVC (high-voltage cut-off) point (normally 3.6V for LiFePo4 cells). This allows car's power electronics systems (charger and motor controller) to detect full discharge/full charge, as well as any type of battery failure. Additional BMS terminals are carrying 12V power supply voltage and a serial communication signal to the dedicated electronic subsystem that measures charge flowing into and out of the sub-pack, and continuously records battery status and any significant events. All additional details of BMS system operations are described in a separate disclosure.

In accordance with one or more embodiments, two battery pack enclosures located under the hood of the vehicle are mounted on the aforesaid frontal subframe assembly. Each battery pack enclosure is fastened to the frontal sub-frame mounting assembly with a plurality of bolts that can be unfastened without removing any other component(s) of the vehicle. This design allows easy installation and removal of each individual battery pack enclosure without removing of any other parts, which leads to easier conversion process and maintenance of the resulting electric vehicle.

Figure 5:
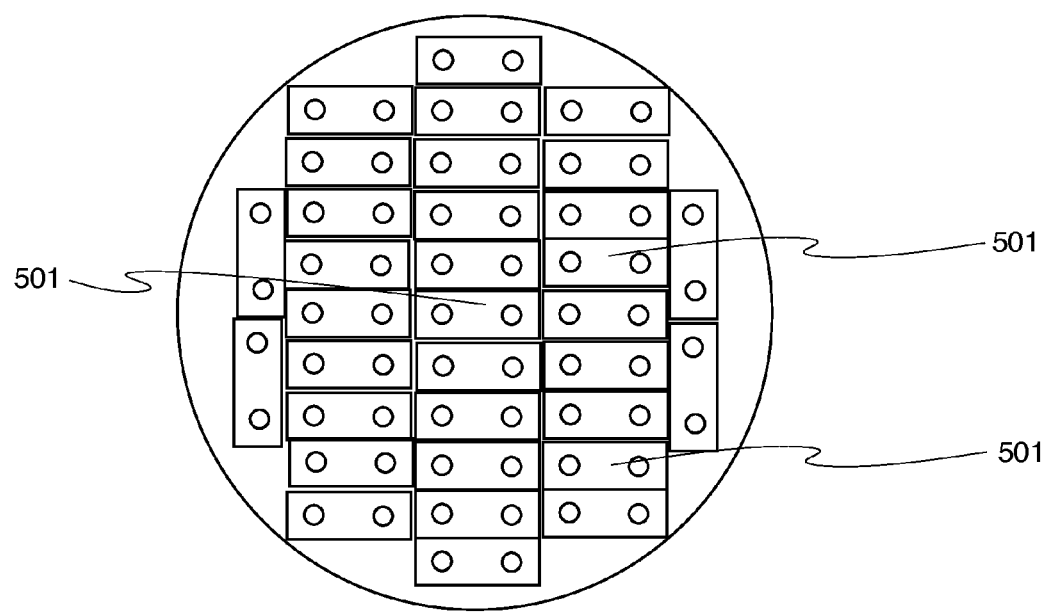
FIG. 5 depicts an exemplary embodiment of a battery pack enclosure mounted in the spare tire well located in the trunk of a passenger vehicle.

In accordance with one or more embodiments, the battery pack enclosure 501 mounted in the vehicle trunk has a shape, which matches the shape of the spare wheel well and it can be easily mounted and removed, as shown in FIG. 5. In one exemplary implementation, it is designed to securely hold 27 LiFePo4 battery cells with 100 AH nominal capacity each in a special arrangement that allows to fill the largest fraction of the available space (see figure).

In accordance with one or more embodiments, the two battery pack enclosures located in the place of the original vehicle fuel tanks are designed to match the shape of said fuel tanks and are mounted using the original mounting brackets and steel strips used to mount the fuel tanks. Apart from maximizing the total installed battery capacity, this arrangement allows to lower the center of gravity of the vehicle, which is very important for preserving the handling characteristics of the original car.

In accordance with one or more embodiments, there is additionally provided a battery pack enclosure in place of the original vehicle 12V led-acid battery. It should be noted that in the ICE vehicles, the 12V led-acid battery is located on the passenger side of the vehicle frame in order to balance the weight of the vehicle's driver. In one or more embodiments, placing a battery pack enclosure containing a predetermined number of LiFePo4 battery cells (for example five, weighing 37 lb in total) preserves this weight balancing advantage, and allows for additional total battery capacity.

In accordance with one or more embodiments, the described modular design of the battery enclosures with multiple battery pack enclosures disposed in the front and in the back of the vehicle provides for optimal weight distribution between the front and back axles for better car performance and handling. With the appropriate battery cell distribution between the described battery pack enclosures, it is possible to achieve the optimal 50/50 weight distribution between the front and rear axles. In one exemplary embodiment, the resulting six-enclosure battery pack has a design capacity of 109 LiFePo4 battery cells with 100 AH nominal capacity each, which is equivalent to approximately 40 kWhrs, sufficient to provide for 120-130 mile electric vehicle range.

In accordance with one or more embodiments, the power cables are electrically connected to each of the battery pack enclosures using high voltage, high current connectors. These connectors are placed at different sides of the battery enclosures relative to the car frame. Such positioning of the power connectors provides for the additional safety benefit of physical circuit breaking during the impact of the accident. It is sufficient to displace the enclosure by about two inches relative to the vehicle frame (front, back or side collision) for the connector to snap out of the socket and break the high voltage electrical circuit of the electrical vehicle's power system.

In accordance with one or more embodiments, any presently known or later developed composite materials may be used in fabricating the described battery pack enclosures. In one exemplary embodiment, the one or more of the described battery back enclosures are fabricated using a fiberglass with polyester resin. Such materials provide many advantages, which include, without limitation:

1. A quarter inch think fiberglass yields exceptional strength for carrying the significant battery load, while weighing less than 50% of the comparable-strength steel box.

2. Additionally, fiberglass is a good isolator which substantially increases the safety of the enclosure.

3. Water resistance and corrosion resistance makes this material further superior to metal alternatives.

4. Enclosure made of fiberglass is rigid yet provides enough flexibility to absorb vibrations and withstand high physical impact in case of the collisions. Experiments show that a quarter inch fiberglass sheet can withstand an impact that would puncture a quarter inch aluminum plate.

5. Enclosures are designed in a way to allow easy and scalable production using a "mold and wet layout" technique. Such production can be outsourced to any custom fiberglass shop at a very low cost.

However, as would be appreciated by persons of ordinary skill in the art, the inventive system design is not limited to the described materials and any other suitable composite or non-composite materials, including, without limitation, sheet metal, may be used in the fabrication of the battery enclosure as well.

In accordance with one or more embodiments, the battery enclosures are designed to be delivered to customers (or third parties, such as mechanic shops, performing the electric vehicle conversion) fully assembled and sealed. In one or more embodiments, all batteries housed in the battery enclosures are equipped with individual BMS boards, connected and secured inside the enclosure. The enclosures then will have to be mounted in designated places and the power cables (preferably supplied with the conversion kit) should be appropriately connected and secured. This approach makes the electric conversion process immeasurably more simple.

Figure 6:
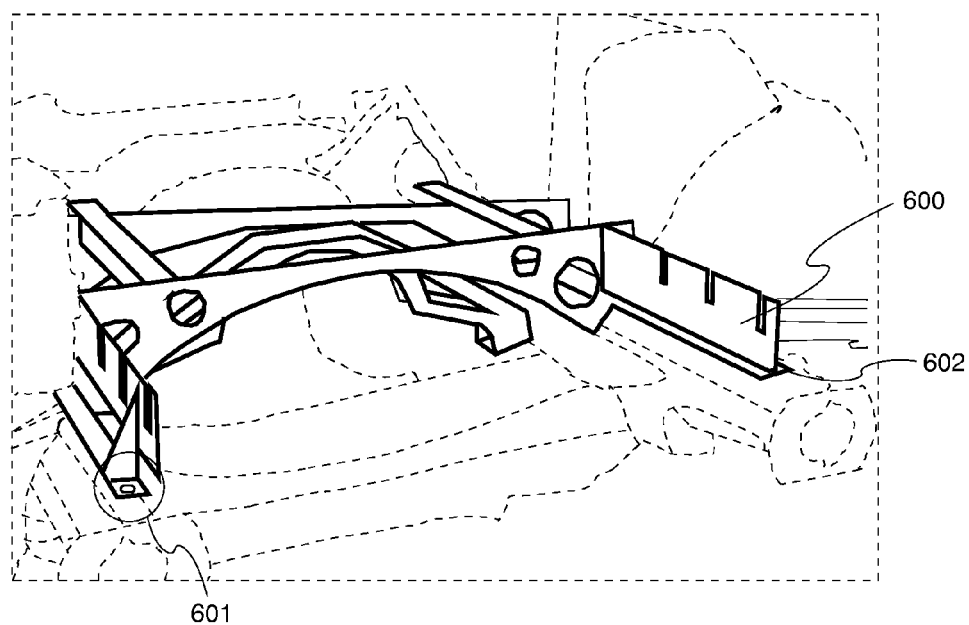
FIG. 6 depicts exemplary embodiments of a frontal mounting subframe assembly and an electric motor mounting frame assembly mounted on a frame of a passenger vehicle.

In accordance with one or more embodiments, the frontal mounting subframe assembly 600 is designed to provide the simplicity of installation and removal. It slides in onto the vehicle frame and is fastened in place with four or more bolts, as shown in FIG. 6 (illustrating subframe mounting points 601 and 602). Preferably, the frontal mounting subframe assembly 600 is manufactured from quarter inch steel plate. Metal profiles of the frontal mounting subframe assembly 600 can be cut on plasma CNC machine and welded together. Such process is highly scalable and can be outsourced to any metal shop. Holes of round or other alternative shapes could be cut in the profiles of the frontal mounting subframe assembly 600 for weight reduction purposes.

In accordance with one or more embodiments, one of the features of the described inventive design is that the frontal mounting subframe assembly 600 can be fit onto various vehicle models with very little modification. Specifically, to fit a vehicle with wider/narrower space available, only the bottom portions of the frontal mounting subframe assembly 600 assembly structure need to be moved relative to the default position—the rest of the frontal mounting subframe assembly 600 remains unchanged. This facilitates further simplification of the manufacturing process as only one upper subframe design needs to be manufactured, with only the lower portion of the subframe design modified according to the vehicle's available space and frame configuration.

In accordance with one or more embodiments, along with the battery enclosures the described sub-frame carries such auxiliary devices as electric power steering pump and electric vacuum pump for power brakes. One of the features of various embodiments feature of the inventive design is to further simplify the final conversion process—the sub-frame with the auxiliary devices already mounted on it should just be bolted on the frame and appropriate hoses and electric plugs connected to corresponding vehicle systems. Such conversion process can be accomplished without requiring any special prior experience in electric car conversions.

Moreover, other implementations of the invention will be apparent to those skilled in the art from consideration of the specification and practice of the invention disclosed herein. Various aspects and/or components of the described embodiments may be used singly or in any combination in the electric vehicle conversion system. It is intended that the specification and examples be considered as exemplary only, with a true scope and spirit of the invention being indicated by the following claims.

What is claimed is:

1. An electric vehicle conversion system comprising at least three battery packs disposed within at least three battery pack enclosures, a frontal mounting subframe assembly attached to a vehicle frame and operable to securely support the at least three battery pack enclosures, an electric motor and electric motor mounting frame assembly attached to the vehicle frame and operable to securely support the electric motor, wherein a first of the at least three battery pack enclosures is disposed in front of the electric motor and a second and a third of the at least three battery pack enclosures is disposed above the electric motor.

2. The electric vehicle conversion system of claim 1, wherein the electric motor is attached to the electric motor mounting frame assembly using a bolt and a lifteye bolt threaded hole.

3. The electric vehicle conversion system of claim 1, further comprising at least one bottom electric motor supporting member comprising a ⅛ thick steel strip attached to the electric motor mounting frame assembly and operable to support the motor from the bottom.

4. The electric vehicle conversion system of claim 1, wherein battery pack enclosures comprise a fiberglass and a polyester resin.

5. The electric vehicle conversion system of claim 1, comprising six battery packs.

6. The electric vehicle conversion system of claim 1, wherein the frontal mounting subframe assembly is operable to securely support the at least three battery pack enclosures disposed under a hood of the vehicle.

* * * * *